United States Patent
Chen et al.

(10) Patent No.: US 12,034,607 B2
(45) Date of Patent: Jul. 9, 2024

(54) LED DISPLAY SCREEN CONTROLLER AND DISPLAY CONTROL SYSTEM

(71) Applicant: XI'AN NOVASTAR TECH CO., LTD., Shaanxi (CN)

(72) Inventors: Xiongwei Chen, Shaanxi (CN); Dan Han, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 218 days.

(21) Appl. No.: 17/602,772

(22) PCT Filed: Sep. 9, 2019

(86) PCT No.: PCT/CN2019/104908
§ 371 (c)(1),
(2) Date: Oct. 10, 2021

(87) PCT Pub. No.: WO2021/046679
PCT Pub. Date: Mar. 18, 2021

(65) Prior Publication Data
US 2022/0191109 A1    Jun. 16, 2022

(51) Int. Cl.
*H04L 41/22*      (2022.01)
*G06F 3/14*       (2006.01)

(52) U.S. Cl.
CPC ............... *H04L 41/22* (2013.01); *G06F 3/14* (2013.01)

(58) Field of Classification Search
CPC .................................. H04L 41/22; G06F 3/14
See application file for complete search history.

(56) References Cited

U.S. PATENT DOCUMENTS

2009/0103502 A1*  4/2009  Ikeda ............... H04W 52/245
                                                        370/338
2012/0297048 A1* 11/2012  Hsu ................... H04L 12/2856
                                                        709/223
(Continued)

FOREIGN PATENT DOCUMENTS

CN    102118379 A    7/2011
CN    105321470 A    2/2016
(Continued)

OTHER PUBLICATIONS

International Search Report for corresponding application PCT/CN2019/104908 filed Sep. 19, 2019; Mail date Jun. 4, 2020.

*Primary Examiner* — Derrick V Rose
(74) *Attorney, Agent, or Firm* — Samson G. Yu

(57) ABSTRACT

An LED display screen controller (10, 31) and a display control system (30) are provided. The LED display screen controller (10, 31) includes: an embedded processor (11, 311); a first WiFi component (14, 313); a second WiFi component (15, 314); a wired network component (16, 315); a first Ethernet PHY chip (17, 316), connected between the wired network component (16, 315) and the embedded processor (11, 311); a programmable logic component (12, 312), connected to the embedded processor (11, 311); and an output port (18), connected to the programmable logic component (12, 312) and configured to connect an LED display screen (33). The embedded processor (11, 311) is configured to configure the first WiFi component (14, 313) to work in an AP mode, and the second WiFi component (15, 314) is adapted to work in a Station mode when the first WiFi component (14, 313) works in the AP mode.

14 Claims, 3 Drawing Sheets

(56) References Cited

U.S. PATENT DOCUMENTS

| | | | | |
|---|---|---|---|---|
| 2014/0325409 A1* | 10/2014 | Geva | ................... | G06F 3/0481 |
| | | | | 715/765 |
| 2020/0260513 A1* | 8/2020 | Huang | ................... | H04W 4/80 |
| 2021/0289578 A1* | 9/2021 | Song | ................... | H04W 76/25 |

FOREIGN PATENT DOCUMENTS

| CN | 105551429 A | | 5/2016 |
|---|---|---|---|
| CN | 106488514 A | | 3/2017 |
| CN | 107092459 A | | 8/2017 |
| CN | 208386590 U | * | 1/2019 |
| CN | 109819493 A | | 5/2019 |
| KR | 101473363 B1 | | 12/2014 |

* cited by examiner

LED DISPLAY SCREEN CONTROLLER AND DISPLAY CONTROL SYSTEM

TECHNICAL FIELD

The disclosure relates to the technical field of display, and in particular, to an LED display screen controller and a display control system.

BACKGROUND

As the digital era is increasingly prosperous, information is flooded in every corner. In the era of information explosion, it is very important to quickly attract users' attention. Whether in a mall, airport, or other public occasions, there are a variety of display screens, which are gorgeous in color, rich in content, and flexible in program release. A core device of the existing display screen is an asynchronous control system.

The existing asynchronous control system is provided with a display screen controller. A WiFi component is arranged in the display screen controller and used for supporting a WiFi communication, and may also support an AP mode or a Station mode, where the WiFi component can only work in the AP mode and the Station mode alternatively. That is, when the WiFi component works in the AP mode, the Station mode needs to be turned off, and the display screen controller cannot be connected to a public network through the Station mode of the WiFi component at this moment. When the WiFi component works in the Station mode, the AP mode needs to be turned off, at this time, an external device can only communicate with the display screen controller through the public network, the external device is required to have the capability of the public network. Therefore, providing a display screen controller having both a Station mode and an AP mode is an urgent technical problem to be solved by the disclosure.

SUMMARY

The disclosure provides an LED display screen controller and a display control system, and solves the problem that the existing display screen controller does not support the concurrence of an AP mode and a Station mode.

According to a first aspect of the disclosure, an LED display screen controller is provided, which includes: an embedded processor; a first WiFi component, connected to the embedded processor; a second WiFi component, connected to the embedded processor; a wired network component; a first Ethernet Physical (PHY) chip, connected between the wired network component and the embedded processor; a programmable logic component, connected to the embedded processor; and an output port, connected to the programmable logic component and configured to connect an LED display screen, where the embedded processor is configured to configure the first WiFi component to work in an AP mode, and the second WiFi component is adapted to work in a Station mode when the first WiFi component works in the AP mode.

The WiFi component of the existing display screen controller can only work in the AP mode and the Station mode alternatively, and does not support the concurrence of the AP mode and the Station mode, so that the defects that the display screen controller cannot be connected to a public network after the AP mode of the WiFi component is turned on are caused. According to the LED display screen controller provided by the embodiments of the disclosure, the first WiFi component and the second WiFi component are arranged to be connected to the embedded processor, the embedded processor configures the first WiFi component to work in the AP mode, and the second WiFi component is adapted to work in the Station mode when the first WiFi component works in the AP mode, so that the problem that the existing display screen controller cannot support the simultaneous work in the AP mode and the Station mode is solved. On one hand, when the first WiFi component works, a provided AP hot spot can create a local area network environment for communication between an external device and the LED display screen controller without an external router, and the LED display screen controller can also establish a communication connection with the public network through the second WiFi component. On the other hand, the AP hot spot can function as a router, so that the external device can communicate with the public network through the second WiFi component or the wired network component on the LED display screen controller.

In a possible implementation of the first aspect of the disclosure, the foregoing LED display screen controller further includes: a hub, connected to the embedded processor, the first WiFi component and the second WiFi component being connected to the embedded processor through the hub; and a mobile network component, connected to the embedded processor through the hub.

In a possible implementation of the first aspect of the disclosure, the operation that the embedded processor configures the first WiFi component to work in an AP mode includes that: a driver program corresponding to the first WiFi component is loaded to change a network card name corresponding to the first WiFi component; and a configuration file of the first WiFi component in the AP mode is read to set a mode parameter of the AP mode, thereby finishing the configuration of the first WiFi component working in the AP mode.

In a possible implementation of the first aspect of the disclosure, the embedded processor is further configured to: change a hot spot name and a password corresponding to an AP hot spot in the AP mode.

In a possible implementation of the first aspect of the disclosure, the embedded processor is further configured to: acquire a connection password sent by an external device, and verify the correctness of the connection password; and send, after verifying that the connection password is correct, an IP address to the external device such that the external device establishes a wireless communication with the first WiFi component according to the IP address.

In a possible implementation of the first aspect of the disclosure, the embedded processor is further configured to: bridge the first WiFi component with the second WiFi component, the mobile network component or the wired network component communicated with a public network according to a preset routing rule, including that: it is judged whether the wired network component is communicated with the public network, and when determining that the wired network component is communicated with the public network, the first WiFi component is bridged with the wired network component; when determining that the wired network component is not communicated with the public network, it is judged whether the second WiFi component is communicated with the public network, and when determining that the second WiFi component is communicated with the public network, the first WiFi component is bridged with the second WiFi component; and when determining that the second WiFi component is not communicated with the public network, it is judged whether the mobile network component is communicated with the public network, and when determining that the mobile network component is communicated with the public network, the first WiFi component is bridged with the mobile network component.

In a possible implementation of the first aspect of the disclosure, the foregoing LED display screen controller further includes: a network output component, including a network port and a second Ethernet PHY chip connected between the programmable logic component and the network port, where the network port serves as the output port and is configured to connect the LED display screen.

In a possible implementation of the first aspect of the disclosure, the foregoing LED display screen controller further includes: a first circuit board, the embedded processor, the hub, the first WiFi component, the second WiFi component, the first Ethernet PHY chip, the mobile network component and the wired network component being arranged on the first circuit board; and a second circuit board, the programmable logic component, the network port and the second Ethernet PHY chip being arranged on the second circuit board.

According to a second aspect of the disclosure, a display control system is provided, which includes: a display screen controller, including: an embedded processor; a programmable logic component, connected to the embedded processor; a first WiFi component, connected to the embedded processor; a second WiFi component, connected to the embedded processor; a wired network component; a first Ethernet Physical (PHY) chip, connected between the wired network component and the embedded processor; a second Ethernet PHY chip, connected to the programmable logic component; a network port, connected to the programmable logic component through the second Ethernet PHY chip; a display control card, connected to the network port of the display screen controller; and a display screen, connected to the display control card, where the embedded processor is configured to configure the first WiFi component to work in an AP mode, and the second WiFi component is adapted to work in a Station mode when the first WiFi component works in the AP mode.

The WiFi component of the existing display screen controller can only work in the AP mode and the Station mode alternatively, and cannot support the concurrence of the AP mode and the Station mode, so that the defects that the display screen controller cannot be connected to a public network after the AP mode of the WiFi component is turned on are caused. According to the display screen controller in the display control system provided by the embodiments of the disclosure, the first WiFi component and the second WiFi component are arranged to be connected to the embedded processor, the embedded processor configures the first WiFi component to work in the AP mode, and the second WiFi component is adapted to work in the Station mode when the first WiFi component works in the AP mode, so that the problem that the existing display screen controller cannot support the simultaneous work in the AP mode and the Station mode is solved. On one hand, when the first WiFi component works, a provided AP hot spot can create a local area network environment for communication between an external device and the display screen controller without an external router, and the display screen controller can also establish a communication connection with the public network through the second WiFi component. On the other hand, the AP hot spot can function as a router, so that the external device can communicate with the public network through the second WiFi component or the wired network component on the display screen controller.

In a possible implementation of the second aspect of the disclosure, the operation that the embedded processor configures the first WiFi component to work in an AP hot spot mode includes that: a driver program corresponding to the first WiFi component is loaded to change a network card name corresponding to the first WiFi component; and a configuration file of the first WiFi component in the AP mode is read to set a mode parameter of the AP mode, thereby finishing the configuration of the first WiFi component working in the AP mode.

In a possible implementation of the second aspect of the disclosure, the display screen controller further includes: a hub, connected to the embedded processor, the first WiFi component being connected to the embedded processor through the hub, and the second WiFi component being connected to the embedded processor through the hub.

In a possible implementation of the second aspect of the disclosure, the display screen controller further includes: a mobile network component, connected to the embedded processor through the hub.

In a possible implementation of the second aspect of the disclosure, the embedded processor is further configured to: change a hot spot name and password corresponding to an AP hot spot in the AP mode.

In a possible implementation of the second aspect of the disclosure, the embedded processor is further configured to: acquire a connection password sent by an external device, and verify the correctness of the connection password; and send, after verifying that the connection password is correct, an IP address to the external device such that the external device establishes a wireless communication with the first WiFi component according to the IP address.

In a possible implementation of the second aspect of the disclosure, the embedded processor is further configured to: bridge the first WiFi component with the second WiFi component, the mobile network component or the wired network component communicated with a public network according to a preset routing rule. The operation that the first WiFi component is bridged with the second WiFi component, the mobile network component or the wired network component communicated with the public network according to the preset routing rule includes that: it is judged whether the wired network component is communicated with the public network, and when determining that the wired network component is communicated with the public network, the first WiFi component is bridged with the wired network component; when determining that the wired network component is not communicated with the public network, it is judged whether the second WiFi component is communicated with the public network, and when determining that the second WiFi component is communicated with the public network, the first WiFi component is bridged with the second WiFi component; and when determining that the second WiFi component is not communicated with the public network, it is judged whether the mobile network component is communicated with the public network, and when determining that the mobile network component is communicated with the public network, the first WiFi component is bridged with the mobile network component.

The above-mentioned technical features of the disclosure may have one or more of the following beneficial effects: the first WiFi component and the second WiFi component are arranged to be connected to the embedded processor, the embedded processor configures the first WiFi component to work in the AP mode, and the second WiFi component is adapted to work in the Station mode when the first WiFi component works in the AP mode, so that the problem that the existing display screen controller cannot support the simultaneous work in the AP mode and the Station mode is solved. On one hand, when the first WiFi component works, a provided AP hot spot can create a local area network environment for communication between an external device and the display screen controller without an external router, and the display screen controller can also establish a communication connection with the public network through the second WiFi component. On the other hand, the AP hot spot can function as a router, so that the external device can communicate with the public network through the second WiFi component, the mobile network component or the wired network component on the display screen controller.

BRIEF DESCRIPTION OF THE DRAWINGS

The accompanying drawings described herein are used to provide a further understanding of the disclosure, and constitute a part of the disclosure, and the exemplary embodiments of the disclosure and the description thereof are used to explain the disclosure, but do not constitute improper limitations to the disclosure. In the drawings.

DESCRIPTION OF THE REFERENCE SIGNS

Figure 1:
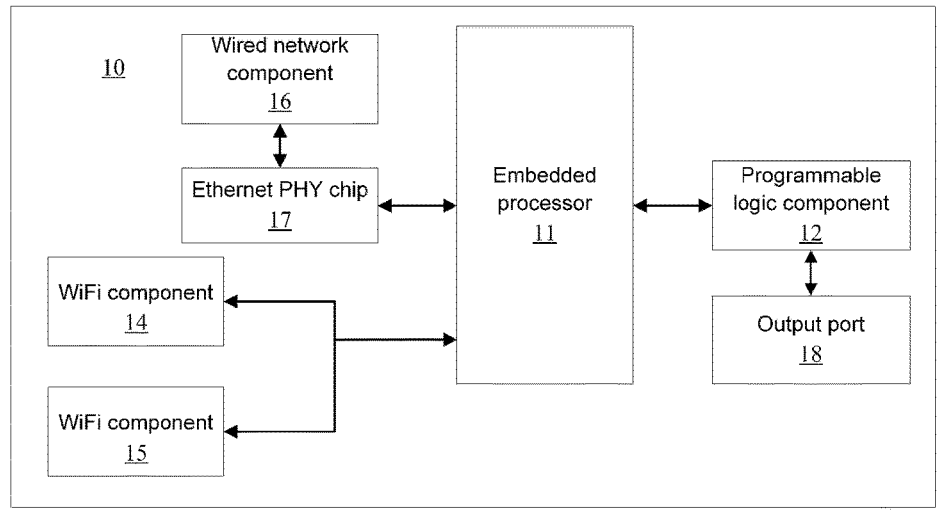
FIG. 1 is a schematic structural diagram of an LED display screen controller according to a first embodiment of the disclosure.

10: LED display screen controller; 11: embedded processor; 12: programmable logic component; 13: hub; 14: WiFi component; 15: WiFi component; 16: wired network component; 17: Ethernet PHY chip; 18: output port; 180: network output component; 181: network port; 182: Ethernet PHY chip; 19: mobile network component;

30: display control system; 31: display screen controller; 32: display control card; 33: display screen; 311: embedded processor; 312: programmable logic component; 313: WiFi component; 314: WiFi component; 315: wired network component; 316: Ethernet PHY chip; 317: Ethernet PHY chip; 318: network port; 319: hub; 320: mobile network component.

DETAILED DESCRIPTION OF THE EMBODIMENTS

It is to be noted that embodiments in the disclosure and characteristics in the embodiments may be combined under the condition of no conflicts. The disclosure is described below with reference to the drawings and in conjunction with the embodiments.

In order to make those of ordinary skill in the art better understand the technical solutions of the disclosure, the technical solutions in the embodiments of the disclosure will be clearly and completely described below with reference to the drawings in the embodiments of the disclosure. It is apparent that the described embodiments are only a part of the embodiments of the disclosure, not all of the embodiments. All other embodiments obtained by those of ordinary skill in the art based on the embodiments of the disclosure without creative efforts should fall within the scope of protection of the disclosure.

It is to be noted that the specification and claims of the disclosure and the terms "first", "second" and the like in the drawings are used to distinguish similar objects, and do not need to describe a specific sequence or a precedence order. It will be appreciated that the terms used in such a way may be exchanged under appropriate conditions, in order that the embodiments of the disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

It is also to be noted that the term "and/or" herein is only an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

It is also to be noted that the division of the various embodiments in the disclosure is for convenience of description only and should not be construed as a particular limitation, and that features of the various embodiments may be combined and referred to herein without conflict.

First Embodiment

Referring to FIG. 1, an LED display screen controller 10 provided by the first embodiment of the disclosure includes, for example: an embedded processor 11, a programmable logic component 12, a WiFi component 14, a WiFi component 15, a wired network component 16, an Ethernet PHY chip 17 and an output port 18.

As shown in FIG. 1, the programmable logic component 12 is connected to the embedded processor 11. The WiFi component 14 is connected to the embedded processor 11. The WiFi component 15 is connected to the embedded processor 11. The Ethernet PHY chip 17 is connected between the wired network component 16 and the embedded processor 11. The output port 18 is connected to the programmable logic component 12 and configured to connect an LED display screen. The embedded processor 11 is configured to configure the WiFi component 14 to work in an AP mode, and the WiFi component 15 is adapted to work in a Station mode when the WiFi component 14 works in the AP mode.

Figure 2:
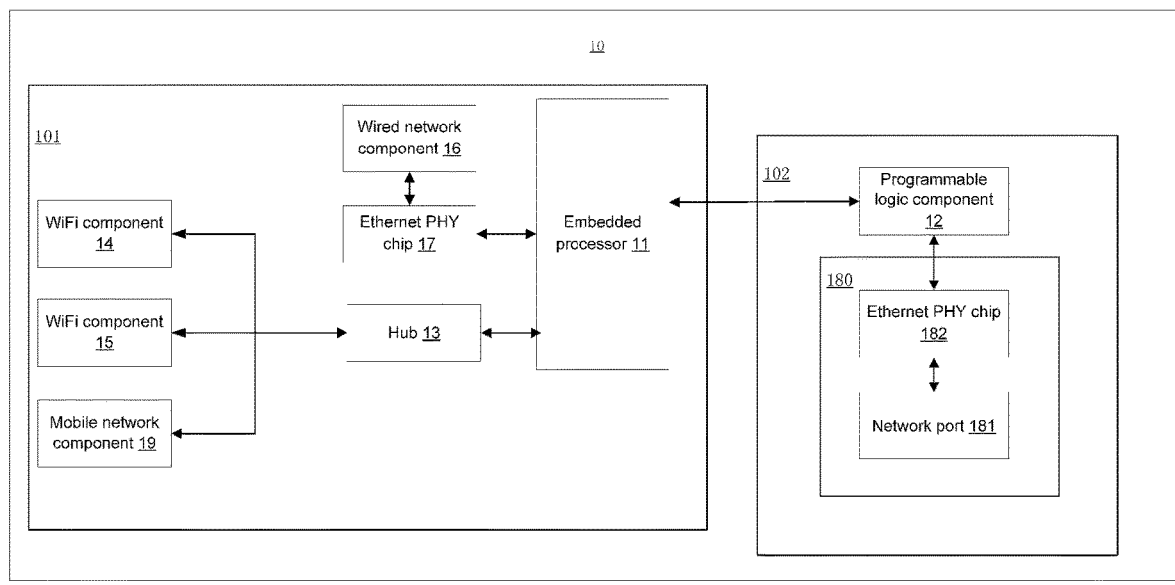
FIG. 2 is another schematic structural diagram of an LED display screen controller according to a first embodiment of the disclosure.

Further, as shown in FIG. 2, the LED display screen controller 10 further includes, for example, a hub 13 and a mobile network component 19. The hub 13 is connected to the embedded processor 11. The WiFi component 14 and the WiFi component 15 are connected to the embedded processor 11 through the hub 13. The mobile network component 19 is connected to the embedded processor 11 through the hub 13. The LED display screen controller 10 is, for example, provided with a reserved position of the mobile network component, and the mobile network component 19 is, for example, plugged into the reserved position of the LED display screen controller 10 as a sub-card. The WiFi component 14, the WiFi component 15 and the mobile network component 19 are connected to the embedded processor 11 through the same hub 13, and the hub 13 is time-division multiplexed to ensure the working stability of the WiFi component 14, the WiFi component 15 and the mobile network component 19 and increase the distance of network communication.

The operation that the embedded processor 11 configures the WiFi component 14 to work in an AP mode includes that: a driver program corresponding to the WiFi component 14 is loaded to change a network card name corresponding to the WiFi component 14, and a configuration file of the WiFi component 14 in the AP mode is read to set a mode parameter of the AP mode, thereby finishing the configuration of the WiFi component 14 working in the AP mode. The mentioned mode parameter includes: an encryption mode, a communication channel, an AP name, an AP password, a working mode in an AP mode, etc. As an example embodiment, the network card name corresponding to the WiFi component 14 is changed for distinguishing the WiFi component 14 from the WiFi component 15. After the LED display screen controller 10 is powered on and started, the driver program of the WiFi component 14 is automatically loaded to change the network card name corresponding to the WiFi component 14, for example, the name is wap0, the corresponding configuration file is read, and the mode parameter of the AP mode is set to finish configuration.

Further, the embedded processor 11 is, for example, further configured to change a hot spot name and a password corresponding to an AP hot spot in the AP mode of the WiFi component 14. As an example embodiment, the embedded processor 11 provides a service interface to facilitate user invocation. That is, a user can turn on the WiFi component 14 through the service interface to modify the hot spot name and the password corresponding to the AP hot spot. Here, it can be understood that a system APP is provided in the embedded processor 11, and functions such as turning on the WiFi component 14 and modifying the hot spot name and password corresponding to the AP hot spot are provided in the system APP.

Further, the embedded processor 11 is further configured to acquire a connection password sent by an external device, and verify the correctness of the connection password; and send, after verifying that the connection password is correct, an IP address to the external device such that the external device establishes a wireless communication with the WiFi component 14 according to the IP address. As an example embodiment, if the external device wants to connect to the AP hot spot of the WiFi component 14, a connection password needs to be input first, the correctness of the password is verified by the embedded processor 11, and after the password is verified to be correct, an IP address is sent to the external device, so that the external device and the embedded processor 11 establish a wireless connection.

Further, the embedded processor 11 is further configured to bridge the WiFi component 14 with the WiFi component 15, the mobile network component 19 or the wired network component 16 communicated with a public network according to a preset routing rule. The operation includes that: it is judged whether the wired network component 16 is communicated with the public network, and when determining that the wired network component 16 is communicated with the public network, the WiFi component 14 is bridged with the wired network component 16. When determining that the wired network component 16 is not communicated with the public network, it is judged whether the WiFi component 15 is communicated with the public network, and when determining that the WiFi component 15 is communicated with the public network, the WiFi component 14 is bridged with the WiFi component 15. When determining that the WiFi component 15 is not communicated with the public network, it is judged whether the mobile network component 19 is communicated with the public network, and when determining that the mobile network component 19 is communicated with the public network, the WiFi component 14 is bridged with the mobile network component 19. It will be appreciated herein that when the external device is connected to the AP hot spot of the WiFi component 14, a communication connection or data transmission may be established between the LED display screen controller 10 and the external device. Furthermore, the external device connected to the WiFi component 14 may also be connected to the public network, i.e. the external device may select a network component to be communicatively connected, i.e. the WiFi component 15, the mobile network component 19 or the wired network component 16, via the WiFi component 14 according to a preset routing rule. The priority of the wired network component 16 is greater than the priority of the WiFi component 15 and the priority of the WiFi component 15 is greater than the priority of the mobile network component 19. This arrangement ensures the stability of the network connection. Of course, the present embodiment is not so limited.

Further, as shown in FIG. 2, the LED display screen controller 10 provided by the present embodiment further includes, for example: a network output component 180. The network output component 180 includes, for example, a network port 181 and an Ethernet PHY chip 182 connected between the programmable logic component 12 and the network port 181. The network port 181 serves as the foregoing output port 18 and is configured to connect the LED display screen.

Further, the LED display screen controller 10 provided by the present embodiment further includes, for example: a circuit board 101 and a circuit board 102. The embedded processor 11, the hub 13, the WiFi component 14, the WiFi component 15, the wired network component 16, the mobile network component 19, and the Ethernet PHY chip 17 are arranged on the circuit board 101. The programmable logic component 12, the network port 181 and the Ethernet PHY chip 182 are arranged on the circuit board 102. The embedded processor 11 and the programmable logic component 12 are arranged on different circuit boards, so that the maintenance difficulty of the LED display screen controller 10 can be reduced, and the later maintenance workload can be reduced.

Further, the LED display screen controller 10 further includes, for example, a volatile memory, a nonvolatile memory, and a power management chip, each of which is connected to the embedded processor 11.

As an example embodiment, the mentioned embedded processor 11 is, for example, an ARM processor. The programmable logic component 12 is, for example, an FPGA. The hub 13 includes, for example, a USB hub chip. The mobile network component 19 is, for example, a 4G network component. Both the Ethernet PHY chip 17 and the Ethernet PHY chip 182 are, for example, Gigabit PHY chips. The network port 181 is, for example, an RJ45 network port. The aforementioned volatile memory is, for example, LPDDR3. The aforementioned nonvolatile memory is, for example, an EMMC. The mentioned power management chip is, for example, a PMIC. The mentioned external device is, for example, a device such as a mobile phone or a notebook computer. The aforementioned public network refers, for example, to a network provided by a network service provider, such as a network provided by a server or a cloud platform.

The embedded processor 11 is a core part of the whole LED display screen controller 10 and internally runs an operating system (Android or Linux system) and application software related to functions after power-up to control communication and data transmission between the various external devices and internal devices. The embedded processor 11 and the programmable logic component 12 are connected, for example, via an RGB bus, and communicate via a serial bus such as an SPI bus. The embedded processor 11 carries the Android system and may also control and process the playing content of a playing box where the LED display screen controller 10 is located, such as communication with an upper computer, video acquisition, decoding, video zooming processing, screen matching, and other operations. After receiving display data, such as RGB data, of a display channel of the embedded processor 11, the programmable logic component 12 caches the data, and then outputs and drives the LED display screen for image display through the network output component 180.

Further, the embedded processor 11 has integrated therein a USB PHY through which the embedded processor 11 implements data transmission with the hub 13, for example.

Figure 3:
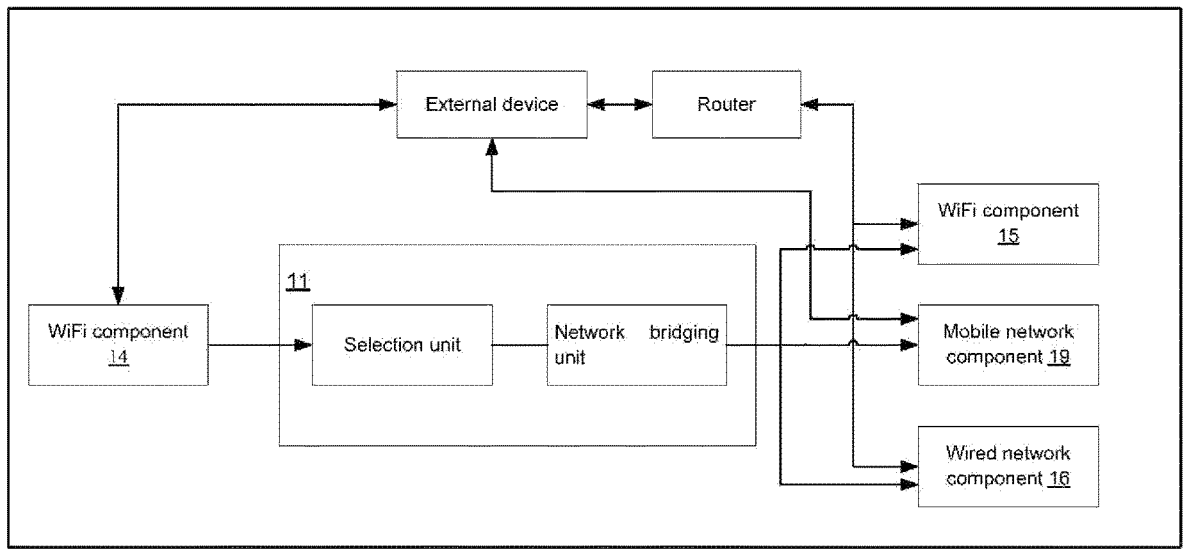
FIG. 3 is a schematic network communication diagram of an LED display screen controller according to a first embodiment of the disclosure.

Further, the network communication process of the LED display screen controller provided by the first embodiment of the disclosure is briefly described with reference to FIG. 3. The WiFi component 14 works in the AP mode and the WiFi component 15 works in the Station mode.

The external device connects the AP hot spot of the WiFi component 14 of the LED display screen controller 10 and the WiFi component 14 to form a local area network mode so as to establish a connection with the LED display screen controller 10. In addition, the LED display screen controller 10 may also be connected to the public network through the WiFi component 15, the mobile network component 19 or the wired network component 16. The external device may also be connected to the WiFi component 15 or the wired network component 16 via a router to establish a communication connection with the LED display screen controller, and the external device may also be connected to the mobile network component 19 to establish a connection with the LED display screen controller. When the WiFi component 14, the WiFi component 15, the mobile network component 19 and the wired network component 16 exist at the same time, the external device may communicate with the LED display screen controller after being connected to the WiFi component 14 to form a local area network, and the external device may randomly select a path from the WiFi component 15, the mobile network component 19 and the wired network component 16 through a selection unit inside the embedded processor 11 to establish a connection thereto via a network bridging unit inside the embedded processor 11 so that the external device connected to the WiFi component 14 may be connected to the public network. The path selection by the selection unit here is carried out according to the preference of a wired network over a wireless network over a mobile network.

In summary, the display screen controller 10 provided by the first embodiment of the disclosure is provided with the WiFi component 14 and the WiFi component 15 connected to the embedded processor 11, the embedded processor 11 configures the WiFi component 14 to work in the AP mode, and the WiFi component 15 is adapted to work in the Station mode when the WiFi component 14 works in the AP mode, and can simultaneously support the AP mode and the Station mode. On one hand, when the WiFi component 14 works, a provided AP hot spot can create a local area network environment for communication between an external device and the display screen controller 10 without an external router. On the other hand, the AP hot spot can function as a router, so that the external device can communicate with the public network through the WiFi component 15, the mobile network component 19 or the wired network component 16 on the display screen controller 10.

Second Embodiment

Figure 4:
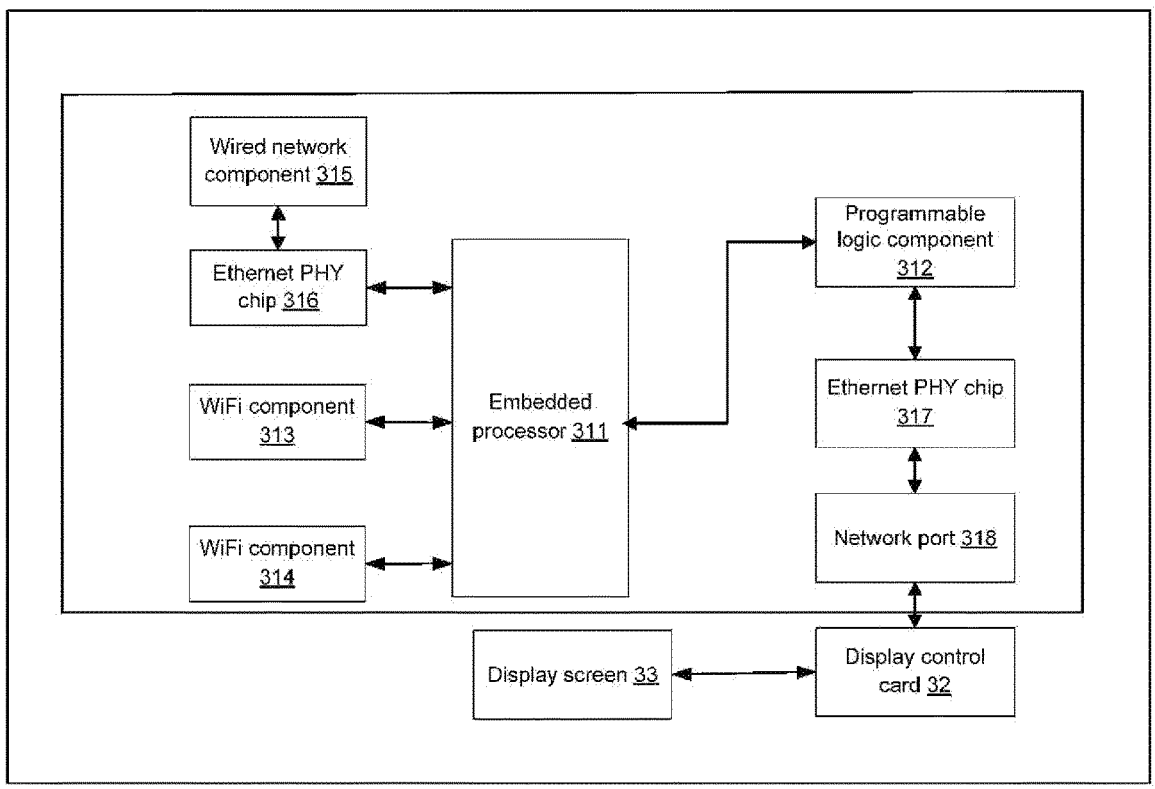
FIG. 4 is a schematic structural diagram of a display control system according to a second embodiment of the disclosure.

Referring to FIG. 4, a display control system 30 provided by the second embodiment of the disclosure includes, for example: a display screen controller 31, a display control card 32 and a display screen 33.

As shown in FIG. 4, the display screen controller 31 includes, for example: an embedded processor 311, a programmable logic component 312, a WiFi component 313, a WiFi component 314, a wired network component 315, an Ethernet PHY chip 316, an Ethernet PHY chip 317, and a network port 318.

As an example embodiment, the programmable logic component 312 is connected to the embedded processor 311. The WiFi component 313 is connected to the embedded processor 311. The WiFi component 314 is connected to the embedded processor 311. The Ethernet PHY chip 316 is connected between the wired network component 315 and the embedded processor 311. The Ethernet PHY chip 317 is connected to the programmable logic component 312. The network port 318 is connected to the programmable logic component 312 through the Ethernet PHY chip 317. The display control card 32 is connected to the network port 318 of the display screen controller 31. The display screen 33 is connected to the display control card 32.

The embedded processor 311 is configured to configure the WiFi component 313 to work in an AP mode and the WiFi component 314 is adapted to work in a Station mode when the WiFi component 313 works in the AP mode. The operation that the embedded processor 311 configures the WiFi component 313 to work in an AP mode includes that: a driver program corresponding to the WiFi component 313 is loaded to change a network card name corresponding to the WiFi component 313, and a configuration file of the WiFi component 313 in the AP mode is read to set a mode parameter of the AP mode, thereby finishing the configuration of the WiFi component 313 working in the AP mode.

Figure 5:
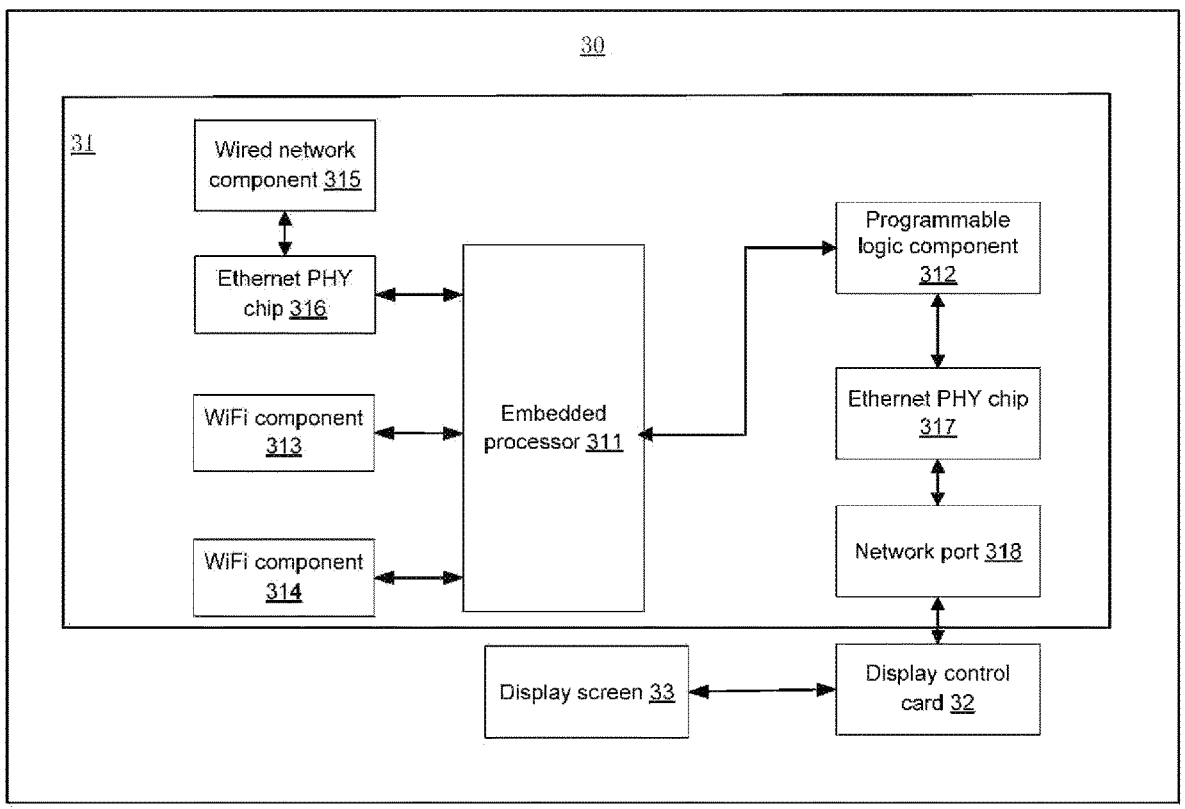
FIG. 5 is another schematic structural diagram of a display control system according to a second embodiment of the disclosure.

Further, as shown in FIG. 5, the display screen controller 311 further includes, for example, a hub 319, connected to the embedded processor 311. The WiFi component 313 is connected to the embedded processor 311 through the hub 319, and the WiFi component 314 is connected to the embedded processor 311 through the hub 319.

Further, as shown in FIG. 5, the display screen controller 311 further includes, for example, a mobile network component 320, connected to the embedded processor 311 through the hub 319. The mobile network component 320 is, for example, plugged into a reserved position of the display screen controller 31 as a sub-card.

Further, the embedded processor 311 is, for example, further configured to change a hot spot name and a password corresponding to an AP hot spot in the AP mode.

Further, the embedded processor 311 is further configured to acquire a connection password sent by an external device, and verify the correctness of the connection password; and send, after verifying that the connection password is correct, an IP address to the external device such that the external device establishes a wireless communication with the WiFi component 313 according to the IP address.

Further, the embedded processor 311 is further configured to bridge the WiFi component 313 with the WiFi component 314, the mobile network component 320 or the wired network component 315 communicated with a public network according to a preset routing rule. The operation includes that: it is judged whether the wired network component 315 is communicated with the public network, and when determining that the wired network component 315 is communicated with the public network, the WiFi component 313 is bridged with the wired network component 315. When determining that the wired network component 315 is not communicated with the public network, it is judged whether the WiFi component 314 is communicated with the public network, and when determining that the WiFi component 314 is communicated with the public network, the WiFi component 313 is bridged with the WiFi component 314. When determining that the WiFi component 314 is not communicated with the public network, it is judged whether the mobile network component 320 is communicated with the public network, and when determining that the mobile network component 320 is communicated with the public network, the WiFi component 313 is bridged with the mobile network component 320. The mentioned public network is a network provided by a network service provider, such as a network provided by a server or a cloud platform.

It is to be noted that the display screen controller 31 in the present embodiment is, for example, the LED display screen controller 10 provided by the first embodiment, and a detailed description of the display screen controller 31 may refer to the foregoing first embodiment, which will not be described in detail herein for the sake of brevity.

The display control card 32 includes, for example, a network port, an Ethernet PHY chip, a programmable logic component, a micro control unit, a memory, a flat cable interface, and other devices. The Ethernet PHY chip is connected between the network port and the programmable logic component, the micro control unit is connected to the programmable logic component, the memory is connected to the programmable logic component and the micro control unit, and the flat cable interface is connected to the programmable logic component. The network port of the display control card 32 is connected to the network port 318 through a network cable. The flat cable interface of the display control card is connected to the display screen 33 through a flat cable.

The display control card 32 is mainly used for driving and controlling the display screen 33 to display. The display screen 33 is, for example, an LED display screen, including one or more LED light panels. The present embodiment does not limit the number of display control cards 32, and the display screen 33 is, for example, connected to multiple display control cards 33.

In summary, the display screen controller 31 in the display control system 30 provided by the second embodiment of the disclosure is provided with the WiFi component 313 and the WiFi component 314 connected to the embedded processor 311, the embedded processor 311 configures the WiFi component 313 to work in the AP mode, and the WiFi component 314 is adapted to work in the Station mode when the WiFi component 313 works in the AP mode, so that the problem that the existing display screen controller cannot support the simultaneous work in the AP mode and the Station mode is solved, and the AP mode and the Station mode can be simultaneously supported. On one hand, when the WiFi component 313 works, a provided AP hot spot can create a local area network environment for communication between an external device and the display screen controller 31 without an external router. On the other hand, the AP hot spot can function as a router, so that the external device can communicate with the public network through the WiFi component 313, the mobile network component 320 or the wired network component 315 on the display screen controller 31.

From the above description of the implementations, it will be clear to a person skilled in the art that the disclosure can be implemented by means of software plus a necessary general hardware platform. Based on this understanding, the technical solution of the disclosure, in essence or as part of its contribution to the existing technology, may be embodied in the form of a software product, which may be stored in a storage medium, such as a ROM/RAM, and optical and magnetic disks, including a plurality of instructions for causing a computer device (which may be a personal computer, a server, or a network device, etc.) to perform the methods of various embodiments or some portions of the embodiments of the disclosure.

It will be apparent to those skilled in the art that the various components or method steps described above in the disclosure may be implemented using a general computing apparatus, either centralized on a single computing apparatus or distributed across a network composed of multiple computing apparatuses, or alternatively implemented using program code executable by the computing apparatuses. Therefore, they may be stored in a storage apparatus for execution by the computing apparatuses, or they may be implemented by being manufactured separately as individual integrated circuit components, or by manufacturing multiple components or steps thereof as a single integrated circuit component. Therefore, the disclosure is not limited to the combination of any specific hardware and software.

The above is only the preferred embodiments of the disclosure and is not intended to limit the disclosure. As will occur to those skilled in the art, the disclosure is susceptible to various modifications and changes. Any modifications, equivalent replacements, improvements and the like made within the spirit and principle of the disclosure shall fall within the scope of the disclosure.

What is claimed is:

1. An LED display screen controller, comprising:
an embedded processor;
a first WiFi component, connected to the embedded processor;
a second WiFi component, connected to the embedded processor;
a wired network component;
a first Ethernet Physical (PHY) chip, connected between the wired network component and the embedded processor;
a programmable logic component, connected to the embedded processor; and
an output port, connected to the programmable logic component and configured to connect an LED display screen,
wherein the embedded processor is configured to configure the first WiFi component to work in an Access Point (AP) mode, and the second WiFi component is adapted to work in a Station mode when the first WiFi component works in the AP mode;
wherein the LED display screen controller further comprising: a network output component, comprising a network port and a second Ethernet PHY chip connected between the programmable logic component and the network port, wherein the network port serves as the output port and is configured to connect the LED display screen.

2. The LED display screen controller according to claim 1, further comprising:
a hub, connected to the embedded processor, the first WiFi component and the second WiFi component being connected to the embedded processor through the hub; and
a mobile network component, connected to the embedded processor through the hub.

3. The LED display screen controller according to claim 1, wherein the embedded processor configures the first WiFi component to work in the AP mode comprising:
loading a driver program corresponding to the first WiFi component to change a network card name corresponding to the first WiFi component; and
reading a configuration file of the first WiFi component in the AP mode to set a mode parameter of the AP mode, thereby finishing a configuration of the first WiFi component working in the AP mode.

4. The LED display screen controller according to claim 1, wherein the embedded processor is further configured to:
change a hot spot name and a password corresponding to an AP hot spot in the AP mode.

5. The LED display screen controller according to claim 1, wherein the embedded processor is further configured to:
acquire a connection password sent by an external device, and verify a correctness of the connection password; and
send, after verifying that the connection password is correct, an IP address to the external device such that the external device establishes a wireless communication with the first WiFi component according to the IP address.

6. The LED display screen controller according to claim 2, wherein the embedded processor is further configured to:
bridge the first WiFi component with the second WiFi component, the mobile network component or the wired network component communicated with a public network according to a preset routing rule, comprising:
judging whether the wired network component is communicated with the public network, and when determining that the wired network component is communicated with the public network, bridging the first WiFi component with the wired network component;
when determining that the wired network component is not communicated with the public network, judging whether the second WiFi component is communicated with the public network, and when determining that the second WiFi component is communicated with the public network, bridging the first WiFi component with the second WiFi component; and
when determining that the second WiFi component is not communicated with the public network, judging whether the mobile network component is communicated with the public network, and when determining that the mobile network component is communicated with the public network, bridging the first WiFi component with the mobile network component.

7. The LED display screen controller according to claim 1, further comprising:
a first circuit board, the embedded processor, the hub, the first WiFi component, the second WiFi component, the first Ethernet PHY chip, the mobile network component and the wired network component being arranged on the first circuit board; and
a second circuit board, the programmable logic component, the network port and the second Ethernet PHY chip being arranged on the second circuit board.

8. A display control system, comprising:
a display screen controller, comprising:
an embedded processor;
a programmable logic component, connected to the embedded processor;
a first WiFi component, connected to the embedded processor;
a second WiFi component, connected to the embedded processor;
a wired network component;
a first Ethernet Physical (PHY) chip, connected between the wired network component and the embedded processor;
a second Ethernet PHY chip, connected to the programmable logic component;
a network port, connected to the programmable logic component through the second Ethernet PHY chip;
a display control card, connected to the network port of the display screen controller; and
a display screen, connected to the display control card,
wherein the embedded processor is configured to configure the first WiFi component to work in an AP mode, and the second WiFi component is adapted to work in a Station mode when the first WiFi component works in the AP mode;
wherein the display screen controller further comprising:
a network output component, comprising a network port and a second Ethernet PHY chip connected between the programmable logic component and the network port, wherein the network port serves as the output port and is configured to connect the LED display screen.

9. The display control system according to claim 8, wherein the embedded processor is configured to configure the first WiFi component to work in the AP hot spot mode, comprising:
loading a driver program corresponding to the first WiFi component to change a network card name corresponding to the first WiFi component; and
reading a configuration file of the first WiFi component in the AP mode to set a mode parameter of the AP mode, thereby finishing the configuration of the first WiFi component working in the AP mode.

10. The display control system according to claim 9, wherein the display screen controller further comprises: a hub, connected to the embedded processor, the first WiFi component being connected to the embedded processor through the hub, and the second WiFi component being connected to the embedded processor through the hub.

11. The display control system according to claim 10, wherein the display screen controller further comprises: a mobile network component, connected to the embedded processor through the hub.

12. The display control system according to claim 9, wherein the embedded processor is further configured to: change a hot spot name and a password corresponding to an AP hot spot in the AP mode.

13. The display control system according to claim 9, wherein the embedded processor is further configured to:

acquire a connection password sent by an external device, and verify a correctness of the connection password; and send, after verifying that the connection password is correct, an IP address to the external device such that the external device establishes a wireless communication with the first WiFi component according to the IP address.

14. The display control system according to claim 11, wherein the embedded processor is further configured to:

bridge the first WiFi component with the second WiFi component, the mobile network component or the wired network component communicated with a public network according to a preset routing rule, wherein bridging the first WiFi component with the second WiFi component, the mobile network component or the wired network component communicated with the public network according to the preset routing rule comprises:

judging whether the wired network component is communicated with the public network, and when determining that the wired network component is communicated with the public network, bridging the first WiFi component with the wired network component;

when determining that the wired network component is not communicated with the public network, judging whether the second WiFi component is communicated with the public network, and when determining that the second WiFi component is communicated with the public network, bridging the first WiFi component with the second WiFi component; and when determining that the second WiFi component is not communicated with the public network, judging whether the mobile network component is communicated with the public network, and when determining that the mobile network component is communicated with the public network, bridging the first WiFi component with the mobile network component.

\* \* \* \* \*